United States Patent [19]

Salete-Garces

[11] 4,251,243
[45] Feb. 17, 1981

[54] INDUCTION CYCLONIC SEPARATOR

[76] Inventor: Felipe Salete-Garces, Avenida Ano de Juarez 198, Granjas, San Antonio, Iztapalapa, Mexico, 13, D.F.

[21] Appl. No.: 128,785

[22] Filed: Mar. 10, 1980

[30] Foreign Application Priority Data

Oct. 5, 1979 [MX] Mexico ................................. 179550

[51] Int. Cl.³ .............................................. B01D 45/12
[52] U.S. Cl. ........................................ 55/261; 55/282; 55/459 R; 55/419; 209/144
[58] Field of Search .................. 55/261, 310, 338–340, 55/459 R, 282, 459 A, 459 B, 459 C, 459 D, 419, 431, 512; 209/144, 211

[56] References Cited

U.S. PATENT DOCUMENTS

| | | | |
|---|---|---|---|
| 3,199,269 | 8/1965 | Oehlrich et al. | 55/261 |
| 3,283,480 | 11/1966 | Szego | 55/459 |

Primary Examiner—Bernard Nozick
Attorney, Agent, or Firm—Sughrue, Rothwell, Mion, Zinn and Macpeak

[57] ABSTRACT

An induction type cyclonic separator particularly adapted for handling adherent or sticky materials, comprises downwardly converging lower frustoconical body means having a larger diameter upper circumferential edge and a smaller diameter lower circumferential edge for forming an outlet for separated solid material; downwardly diverging upper frustoconical body means having a smaller diameter upper circumferential edge and a larger diameter lower circumferential edge, said lower circumferential edge being introduced within the upper circumferential edge of said lower frustoconical body means in order to have said lower circumferential edge of said upper frustoconical body means arranged concentrically within the conical wall of said lower frustoconical body means; annular lid means between said upper and said lower body means for closing the span therebetween, inlet means tangencially arranged on the wall of said upper body means; circular lid means on the upper end of said upper frustoconical body means; vertical suction duct means arranged at the center of said circular lid means; and a plurality of closeable openings arranged in said annular lid means in a position suitable to downwardly sweep the inner wall of said lower frustoconical body means by admitting air streams therethrough.

6 Claims, 1 Drawing Figure

U.S. Patent
Feb. 17, 1981
4,251,243
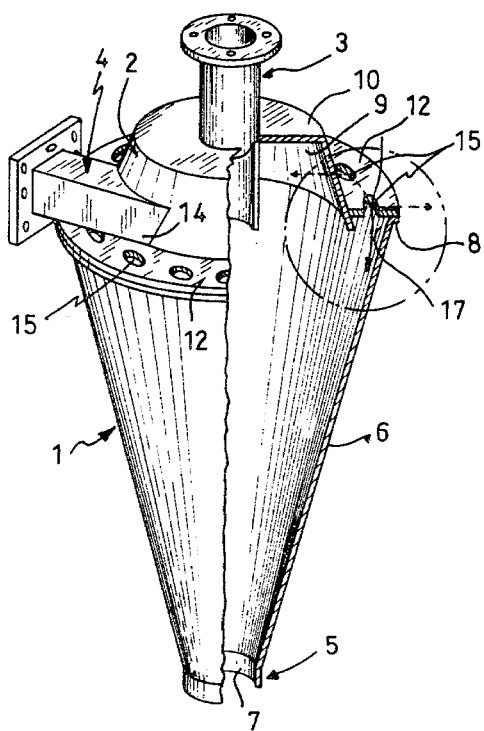

INDUCTION CYCLONIC SEPARATOR

FIELD OF THE INVENTION

The present invention refers to the separation of solid materials entrained in a gaseous stream and, more particularly it is related to an induction type cyclonic separator which is particularly suitable for handling sticky or adherent materials entrained in a gas stream.

BACKGROUND OF THE INVENTION

Centrifugal or cyclonic type separators, also commonly referred to as cyclones, are very well known in the prior art. As it also well known, this type of separators for solid and gaseous materials operate with practically the same efficiency under pressure and under suction. They commonly comprise an upper cylindrical body which is continued downwardly by a lower or dust collecting frustoconical body, said upper cylindrical body having a tangencial inlet for the mixture of gas or solid material to be separated and a vertical duct to serve as the outlet of gases, whereas the frustoconical lower body has a lower opening to serve as the outlet for the separated solid materials.

In induction or suction type cyclonic separators, it has been generally preferred to provide the upper body also with a frustoconical shape, with the larger diameter opening directed downwardly and with a lower body of larger conicity directly joined thereto to form a continuous surface with said upper conical body. The inlet for the mixture of gas and solid material is also arranged tangentially on the wall of said slightly conical downwardly diverging upper frustoconical body, and the outlet duct for gases which is under suction in this particular instance, is arranged vertically on the upper lid of the upper frustoconical body.

The cyclonic type separators known in the prior art, of course, are reasonably efficient to separate various sizes of solid particles entrained in a gas, but show serious drawbacks when the materials to be separated are of the fatty type or of any other characteristics that may render the particles adherent, inasmuch as, even when said particles do not tend to stick to the inner downwardly diverging conical surface provided in the upper bodies of the induction type cyclones, they do tend to be trapped in the corners formed at the joint of the upper frustoconical body and the lower frustoconical body, and they also tend to be adhered over the whole surface of the lower frustoconical body, inasmuch as the latter is downwardly converging and presents an interior surface subject to the action of gravity on the particles falling thereon.

Obviously, the above represents a serious drawback, because it generally requires a cleansing operation and, in extreme cases, it may cause obstruction in the equipment or at least defective operation thereof, wherein the separation of particles is not carried out correctly.

Therefore, for long it has been sought to device a cyclonic separator which, without loosing the efficiency for separating particles of different densities or specific gravities entrained in a gas stream, would be sufficiently efficient to maintain all the inner surfaces of the apparatus absolutely clean, regardless of the fact that sticky or adherent materials are being handled which tend to build up at the corners and over the surfaces subject to the action of gravity in the interior of the equipment.

BRIEF SUMMARY OF THE INVENTION

Having in mind the defects of the prior art cyclonic separators, it is an object of the present invention to provide a cyclonic separator of a very simple construction and yet of a unique efficiency for handling sticky materials and yet maintaining all the inner surfaces of the apparatus absolutely clean.

It is another object of the present invention to provide a cyclonic separator of the above mentioned character, which will be built such that the materials removed from the gas stream will lose contact with the inner surface of the separator momentarily, in order to permit the injection of air streams between said material and the inner wall of the cyclonic separator.

One other object of the present invention is to provide a cyclonic separator of the above mentioned nature, which will avoid the existence of all kinds of corners or turnings wherein the separated solid material may accumulate, particularly when the latter is of a sticky or adherent character.

Another object of the present invention is to provide a cyclonic separator of the above described character, wherein frequent cleansing operations of the equipment will be avoided, with the consequent economy of time and labor.

BRIEF DESCRIPTION OF THE DRAWINGS

The novel features that are considered characteristic of the present invention are set fourth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a perspective somewhat diagrammatic view, partly broken away to show inner details thereof, of a cyclonic separator built in accordance with a particularly preferred embodiment of the invention;

FIG. 2 is a cross-sectional elevational view showing the detail indicated by means of the circle in FIG. 1, in order to illustrate the closeable air injection openings built in accordance with the embodiment shown in FIG. 1 and;

FIG. 3 is a view similar to FIG. 2 but showing the construction of the closeable openings in accordance with a further embodiment of the invention.

DETAILED DESCRIPTION

Having now more particular reference to the drawings, wherein certain illustrative but not limitative embodiments of the instant invention are shown, and more specifically to FIGS. 1 and 2 thereof, there is shown a centrifugal or cyclonic separator built in accordance with a preferred embodiment of the present invention, which comprises a lower frustoconical body 1, with its larger diameter based directed to and opening upwardly, and an upper frustoconical body 2, with its larger diameter base directly to and opening downwardly, concentrically arranged within the upper open end of the frustoconical body 1 and introduced therewithin for a purpose which will be more clearly apparent in the description to follow, the upper body 2 containing a suction duct 3 through which a suitable suction is exerted to drive the gas and solid material to be separated, and an inlet 4 for said gas and solid material mixture, also arranged at the upper frustoconical body 2 and tangentially introduced on its wall 9.

At the lower edge of the lower frustoconical body 1, an outlet mouth for solid material 5 is provided, which may be coupled, such as is well known in the art, with a rotative gas retaining device (which works either under pressure or under suction), in order to suitable collect the separated solid material.

The cyclonic separator built in accordance with the embodiment illustrated in FIGS. 1 and 2 of the drawings, more particularly comprises a lower frustoconical body 1 which is formed by a frustoconical wall 6 which ends at its lower end with a cylindrical short wall 7 forming the mouth 5 for discharging solid material. At its upper end having a larger diameter, said frustoconical wall 6 contains a radially outwardly directed flange 8 over which an annular lid 12 may be suitably mounted, for instance, by means of screws or welding, within which lid 12 the upper frustoconical body 2 is received in accordance with what will be described in more detail hereinafter.

On the other hand, the frustoconical body 2 is formed by a frustoconical wall 9 which upper lower diameter end is closed by means of a circular lid 10, a suction duct 3 being provided at the center of said lid 10, forming an inner projection 13 which lower edge ends at a suitable height, preferably at a level slightly below the level of the lower edge 16 of the conical wall 9, and the said lower open edge 16 of larger diameter of the cone 9, is concentrically inserted inwardly and downwardly of the upper edge of the conical wall 6 of the lower frustoconical body 1, such that a portion 11 of said conical wall 9 will be arranged below the level of the upper edge of the conical wall 6. The outer side wall of the conical wall 9 is joined by suitable means, for instance by welding or the like, to the above described lid 12, which outer edge is in turn joined with the flange 8 of the cone 6, thus forming an annular zone spacing the cones, which is designated as chamber 17, in which the lower end 16 of cone 9 is fully spaced inwardly and concentrically of the inner surface of cone 6, such as it may be more clearly seen in FIG. 2 of the drawings.

The above described inlet 4 is arranged tangentially on the conical wall 9 of the upper frustoconical body 2, such that its inlet opening 14 will be arranged with respect to the conical wall 9, such that it will introduce the stream of gas and solid entering the cyclonic separator built in accordance with the present invention, at a high speed and in a tangential direction with respect to the inner surface of the conical wall 9 of the upper frustoconical body 2.

Throughout the circumference of the annular lid 12 arranged between the lower and upper frustoconical bodies 1 and 2, respectively, a line of closeable openings 15 is arranged, through which openings air may be introduced for a purpose which will be described in more detail in connection with the operation of the device of the present invention.

Said openings 15 may be plugged by means of individual plugs, or may be partially or totally closed by means of the arrangement clearly illustrated in FIG. 3 of the drawings, wherein it may be seen that, above annular lid 12, a complementary annular sliding cover 20 is arranged, which sliding cover may be displaced along the guide formed by a suitable flange 19 supported by a cylindrical member 18 attached to flange 8 of the conical wall 6, such that the guide 19 will serve to freely move the sliding cover 20 with respect to lid 20 and, therefore, to match in a higher or lesser degree the complementary openings 21 of the sliding cover 20 with the openings 15 of the lid 20, in order to open or close all the openings either partailly or totally at will.

The operation of the cyclonic separator built in accordance with the present invention is as follows: The cyclonic separator is subjected to suction by means of any vacuum producing device, such as a centrifugal or axial fan or a compressor, or by means of a vacuum positive action pump, which is connected to the suction duct 3, such that it will exert an effective suction through the projection 13 of said duct 3, thus driving a stream of gas and particulate solid materials to be injected through the mouth 14 of the feed duct 4, tangentially into the inner surface of the conical wall 9 of the upper frustoconical body 2. The mixture of gas and solid particles, entering fastly and tangentially through the mouth 14, enters at a predetermined speed such that only the very small particles or the particles having a lower specific gravity will be removed from the apparatus through the top thereof, entrained in the gas, that is, through the tubular projection 13 and duct 3 forced by the suction, whereas the larger particles and the particles of higher specific gravity will overcome the entraining force caused by the suction and will fall by the action of gravity and the centrifugal force, along the interior of the conical wall 9, to continue to fall thereafter along the lower frustoconical body 1 and be collected through the lower mouth 5 wherein the air or pressure retainer mentioned above is arranged.

In the usual operation of the prior art cyclonic separators, the inner walls thereof are progressively covered by adherent particles, particularly when working with fatty materials or with materials of any other nature that will render them adherent or sticky and this, as described above, represents a very serious drawback, because it forces to introduce frequent cleansing operations and, in extreme cases, it may cause obstructions of the equipment or at least defective operations wherein the separation of particles is not achieved correctly.

In the apparatus built in accordance with the present invention, the inlet for the gas stream entraining the solid materials is formed by the frustoconical body 2, which conical wall 9 has a slanting position which tends to form a part of the roof, that is, which tends to be above, whereby due to the action of gravity, it is practically impossible that particles traveling at a high velocity will remain adhered thereto, inasmuch as said particles are generally released by virtue of the fact that they are being impacted through centrifugal force over a surface which is above and which, therefore, does not tend to retain said particles. The particles running along the inner surface of the conical wall 9, keep on traveling downwardly to the portion 11 of said wall 9 and are thrown under the lower open edge 16 of said wall 9, thereafter impinging on the inner surface of wall 6 of the lower frustoconical body 1, on which surface said particles may be adhered becauses said surface is a sort of a projection of the floor by being below and due to the fact that the particles are falling both by gravity and be centrifugal force on the inner surface of the above mentioned cone 6.

The manner of avoiding the adherence of the particles on the inner wall of the apparatus built in accordance with the present invention, is by providing the concentrical lower edge 16 of the upper frustoconical body 2, fully removed from the inner surface of the conical wall 6 of the lower frustoconical body 1, such that the particles falling thereon will momentarily lose contact with any inner surface of the apparatus of the present invention, which permits the injection of streams of air caused by the suction which creates a vacuum in chamber 17, to force air violently into the openings 15 of the annular lid 12, inasmuch as these air streams, such as it may be clearly seen in the flow arrow illustrated in FIGS. 1 and 2, materially sweep the whole of the inner surface of the cone 6, thus avoiding that the particles which are thrown under the edge 16 of the portion 11 of the upper cone 9, will directly contact the inner surfaces of the cone 6, to instead travel over an air cushion formed by the streams of air introduced through the openings 15 of lid 12, caused by the vacuum created in chamber 17 by the suction exerted through the suction duct 3.

It will be clearly apparent that, depending on the degree of stickiness or adherence of the materials handled, the total opening of the bores 15 of the lid 12 may be suitably controlled, either by means of the plugging of part of said openings individually or by means of the provision of the closure device illustrated in FIG. 3, such that air stream may be higher or lower in intensity, in order to achieve the desired efficiency in the device of the present invention and a very broad versatility, inasmuch as the cyclonic separator of this invention may also be used for non sticky materials, in which case the openings 15 are not necessary and may be fully plugged or covered.

From the above description it may be seen that for the first time an induction type cyclonic separator has been provided which is fully capable of effecting a mechanical separation of particles of different specific gravity or weight, by means of the combined use of centrifugal force and gravity and at the same time taking advantage of the vacuum produced by suction in order to inject streams of air parallel to the inner walls of the apparatus and close to said walls, in order to form an air cushion which will prevent the particles, when the latter are sticky or adherent, to build up over the interior surfaces of the apparatus, thus maintaining the equipment fully clean. This, obviously, represents the elimination of the frequent cleansing operations of the equipment which in normal operation with the presently used prior art apparatus are rendered indispensible, inasmuch as said apparatus are very frequently soiled by virtue of the fact that building up corners exist and by virtue of the fact that the materials travel in direct contact with the inner surfaces, thus causing the undue accumulation of said materials.

Although certain specific embodiments of the present invention have been shown and described above, it is to be understood that many modifications are possible. The present invention, therefore, is not to be restricted except insofar as is necessitated by the prior art and by the spirit of the appended claims.

What I claim is:

1. An induction type cyclonic separator, particularly adapted for handling sticky materials, which comprises lower upwardly diverging frustoconical body means, upper downwardly diverging frustoconical body means, the downwardly opening larger diameter end of said upper frustoconical body means being of a diameter considerably smaller than the diameter of the upwardly opening upper end of said lower frustoconical body means, said upper frustoconical body means being introduced inwardly and downwardly of the upper larger diameter end of said lower frustoconical body means, such that the lower edge of said upper frustoconical body means will be arranged concentrically and inwardly spaced from the inner surface of the lower frustoconical body means and also spaced a distance below the upper edge of said lower frustoconical body means, annular lid means extending between the upper edge of said lower frustoconical body means and the outer surface of the conical wall of said upper frustoconical body means to close the space therebetween, a plurality of closeable openings extending throughout the circumference of said annular lid means, tangential inlet means arranged on the conical wall of said upper frustoconical body means, circular lid means closing the upper end of said upper frustoconical body means, suction duct means vertically arranged at the center of said circular lid means, and outlet means for discharging solid material, arranged at the lower end of said lower frustoconical body means.

2. A cyclonic separator according to claim 1 wherein said lower end of the suction duct means is arranged at a level slightly lower than the level to which the lower end of said upper frustoconical body means is arranged.

3. A cyclonic separator according to claim 2, wherein said lower end of the upper frustoconical body means, said upper end of the lower frustoconical body means and said annular lid means form an annular chamber wherein a vacuum is created by the suction exerted in the device, in order to introduce streams of air through said closeable openings, which streams of air sweep the whole of the inner surface of said lower frustoconical body means, at the time in which the separated solid material loses contact with the inner surfaces when thrown under the lower edge of the said upper frustoconical body means unto the inner surface of said lower frustoconical body means.

4. A cyclonic separator according to claim 3, wherein the slope of the conical wall of said downwardly diverging upper frustoconical body means is such that adherence of the particles over its inner surface is avoided by the action of gravity.

5. A cyclonic separator according to claim 4, wherein said closeable openings are operated by means of individual plugs that may plug a partial or the total number thereof.

6. A cyclonic separator according to claim 4, wherein sliding annular cover means is arranged over said annular lid means, said slidable annular cover means having openings complementary to the said closeable openings of said annular lid means, such that sliding rotation of said slidable annular cover means over said annular lid means causes the total or partial obstruction of each one of said closeable openings.

* * * * *